United States Patent Office 2,997,146
Patented Aug. 22, 1961

2,997,146
AUTOMATIC BRAKE FOR WINCHES AND THE LIKE
Francesco Chiolerio, 35 Corso Stati Uniti, Turin, Italy
Filed Jan. 28, 1960, Ser. No. 5,234
Claims priority, application Italy Mar. 25, 1959
1 Claim. (Cl. 192—8)

Winches and similar hoisting apparatus are equipped with a brake acting on the driven shaft, which automatically comes into action on stoppage of the driving shaft and is released on restarting of the latter. The automatic device acting on the brake for the driven shaft as above is of an electromagnetic type, this device being clumsy and expensive.

This invention provides a mechanical device capable of performing the same function as electromagnetic devices employed heretofore, affording the advantages of reliability in operation and reduced size and cost.

The improved device has associated therewith a disc brake acting on the driven shaft, the operative connection of the driving and driven shafts being of a backlash type and being effected by two cooperating members keyed to the said shafts, respectively, in such a manner that the member keyed on the driving shaft should perform a limited angular displacement before it comes into operative contact with its cooperating member on the driven shaft.

This angular displacement of the driving shaft from its inoperative condition to its position at which it starts carrying along the driven shaft, is utilized according to this invention for effecting through a face cam on the end of the driving shaft an axial movement of the driven shaft, such as by three of four millimeters, sufficient for releasing the brake discs from their cooperating discs keyed to the stationary member of the device against the action of the brake springs which otherwise tend to hold the discs pressed against one another, thereby to brake and lock the driven shaft to the said stationary member. As rotation of the driving shaft ceases as a result of stoppage of the driving motor, the disc brake springs move the driven shaft in a direction opposite to the former, which results in a slight backward angular movement of the driving shaft through reversibility of the face cam on the driving shaft which acts on the driven shaft.

The driven shaft is thereby automatically readily locked on stoppage of the driving shaft.

The device will be described with reference to the drawings which show by way of a non-limiting example an embodiment thereof.

Figure 1:
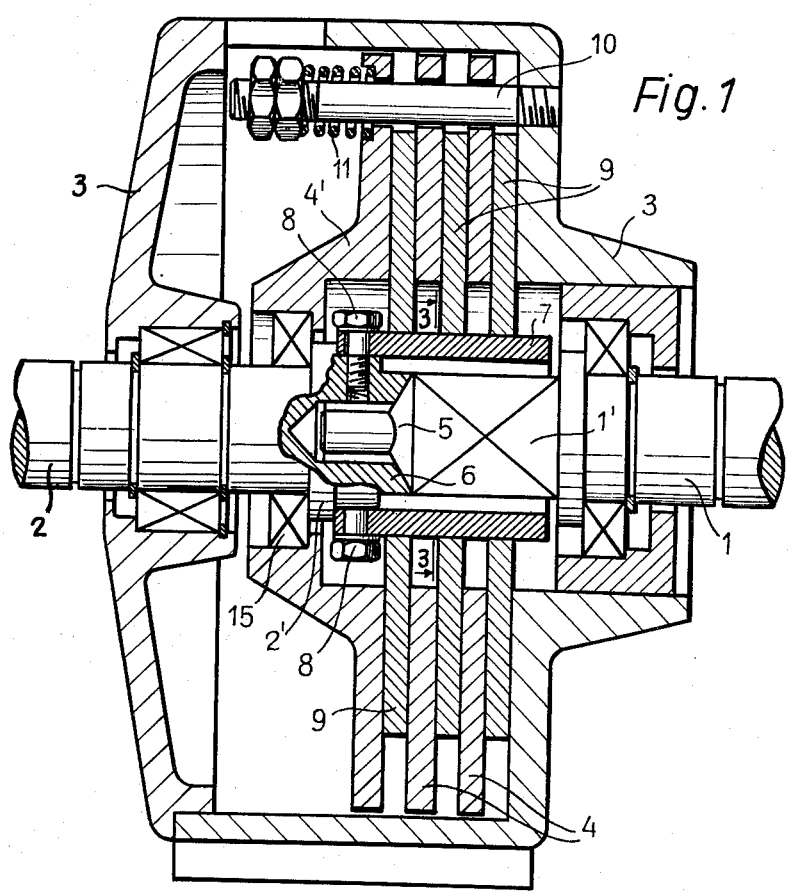
Figure 2:
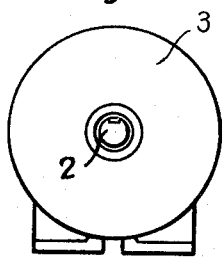
Figure 3:
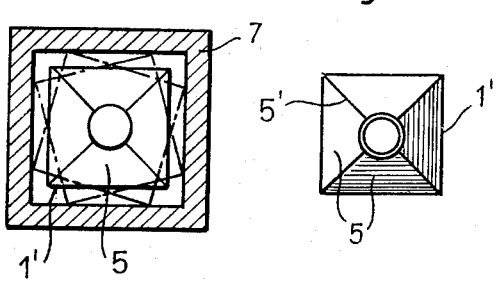
Figure 4:
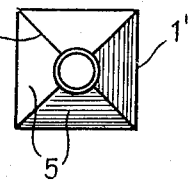

FIGURE 1 is an axial sectional view of the device,
FIGURE 2 is a lateral view thereof from the driven shaft side,
FIGURE 3 is a sectional view on line 3—3 of FIGURE 1, and
FIGURE 4 is a detail front view of the driving shaft.

Reference 1 denotes the driving shaft. Reference 2 denotes the driven shaft which is axially aligned with the shaft 1 and operates through a reducing gear for instance the hoisting members of the winch.

Reference 3 denotes a stationary casing enclosing a disc brake comprising stationary discs 4 which are angularly fixed in the casing, and rotatable discs 9 alternating with the stationary discs 4 and constantly coupled with the driven shaft 2. To this end, the discs 9 are slidably mounted on a bush 7 of square cross-sectional shape, housing a prismatic end section 1' of the driving shaft 1, which is likewise of square cross-sectional shape, FIGURE 3, and such as to leave a certain clearance with respect to the inner square profile of the bush 7, so that an angular displacement by a few degrees, such as 10 or 15°, is necessary before the edges of the prism 1' on the driving shaft abut the sides of the bush 7 thus carrying the latter along in rotation. The bush 7 is securely fixed by means of screws 8 to the end of the driven shaft, which is formed with a hollow front surface in the shape of a truncated pyramid matching the pyramidal front surface 5 on the driving shaft 1.

The driven shaft 2 is moreover formed with an annular abutment 2' for a ball-bearing 15 housed by a pressure plate 4' which is pressed by brake springs 11 fitted on three pins 10, the spring force being adjusted and set by means of nuts and lock-nuts screwed on the screw threaded end of the pins 10.

On stoppage of the motor the springs 11 axially displace the driving shaft 1 through the pressure plate 4' and cooperating face cams of a truncated pyramid shape 5, 6, the driving shaft 1 being thereby brought to a position in which the sides of its prismatic section 1' extend parallel with the sides of the bush 7. This angular movement is effected by an axial displacement of the shaft 2 towards the shaft 1 under the action of the springs 11. Consequently, the plate 4' and discs 4 perform a short stroke, about 3 or 4 mm., as required for braking the interposed rotary discs 9, whereby the driven shaft 2 is automatically locked.

On restarting of the motor, as the shaft 1 starts rotating and before it carries along the driven shaft 2, the said shaft 1 pushes the driven shaft back by its face cam 5 by a few millimeters as required for axially displacing the plate 4' through the abutment 2', to thereby release the discs 9 on the bush 7 which is fast with the shaft 2 from the interposed brake discs 4, whereby the driven shaft and its associated members are freely driven by the motor. On stoppage of the motor the driven shaft is automatically braked and locked as described above.

What I claim is:

In an irreversible drive coupling, a stationary casing having two side walls, a driving shaft rotatably supported by said casing and having an end portion projecting inside the casing through an opening in one of said side walls, a driven shaft coaxial with said driving shaft rotatably and axially slidably supported by said casing and having an end portion projecting inside the casing, said end portion of said driving shaft having an intermediate portion of square shape in cross-section and a frusto-pyramidal convex terminal portion, said end portion of said driven shaft having machined in its front surface a frusto-pyramidal seat for receiving said frusto-pyramidal convex terminal portion of the end portion of said driving shaft, a bush of inner and outer square-shape fast with the end portion of said driven shaft and surrounding said intermediate portion of said end portion of the driving shaft, said bush being so arranged and so shaped that its inner surface is parallel with the outer surface of said intermediate portion of the end portion of the driving shaft when said frusto-pyramidal convex terminal portion is seated in said frusto-pyramidal seat, so that between the surface of said intermediate portion, and the inner surface of said bush, a clearance is left great enough to allow of a limited relative rotation through about 10–15° of said driving and driven shafts starting from a position in which the inner surface of said bush is parallel with the outer surface of said intermediate portion, a first set of discs mounted on said bush and axially slidable but not rotatable with respect to the latter, a second set of annular discs arranged between the discs of said first set, said discs of said second set being supported by said casing and axially slidable but not rotatable therein, an annular thrust disc mounted on the end portion of the driven shaft and adjacent one of the discs of said first set, spring means urging said discs of said first and second sets against each other and against the side wall of the casing opposed to the end portion of the driven shaft, and means fast with said secondary shaft for acting upon said annular thrust disc and displacing it against the action of said spring means.

References Cited in the file of this patent

UNITED STATES PATENTS

| | | |
|---|---|---|
| 1,213,227 | Manhard | Jan. 23, 1917 |
| 1,352,894 | Hoffine | Sept. 14, 1920 |
| 1,632,763 | Kurscheidt et al. | June 14, 1927 |
| 2,391,172 | Leland | Dec. 18, 1945 |
| 2,834,443 | Olchawa | May 13, 1958 |